United States Patent
Chuang et al.

(10) Patent No.: US 11,961,567 B2
(45) Date of Patent: Apr. 16, 2024

(54) KEY STORAGE DEVICE AND KEY GENERATION METHOD

(71) Applicant: PUFsecurity Corporation, Hsinchu County (TW)

(72) Inventors: Kai-Hsin Chuang, Hsinchu County (TW); Chi-Yi Shao, Hsinchu County (TW); Chun-Heng You, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 167 days.

(21) Appl. No.: 17/848,409

(22) Filed: Jun. 24, 2022

(65) Prior Publication Data

US 2023/0091881 A1    Mar. 23, 2023

Related U.S. Application Data

(60) Provisional application No. 63/246,791, filed on Sep. 21, 2021.

(51) Int. Cl.
| | | |
|---|---|---|
| G11C 11/4078 | (2006.01) | |
| G11C 7/24 | (2006.01) | |
| G11C 11/412 | (2006.01) | |
| G11C 16/10 | (2006.01) | |
| G11C 16/22 | (2006.01) | |

(Continued)

(52) U.S. Cl.
CPC ............... *G11C 16/22* (2013.01); *G11C 7/24* (2013.01); *G11C 11/4078* (2013.01); *G11C 11/412* (2013.01); *G11C 16/102* (2013.01); *G11C 16/26* (2013.01); *G11C 16/3404* (2013.01)

(58) Field of Classification Search
CPC ....... G11C 16/22; G11C 7/24; G11C 11/4078; G11C 11/412; G11C 16/102; G11C 16/26; G11C 16/3404; G11C 11/404; G11C 11/417; G06F 21/79; G06F 21/72
See application file for complete search history.

(56) References Cited

U.S. PATENT DOCUMENTS

| | | |
|---|---|---|
| 7,049,667 B2 | 5/2006 | Chow |
| 9,337,156 B2 | 5/2016 | Kuenemund |

(Continued)

FOREIGN PATENT DOCUMENTS

| | | |
|---|---|---|
| TW | I274346 | 2/2007 |
| TW | I373126 | 9/2012 |

*Primary Examiner* — Jay W. Radke
(74) *Attorney, Agent, or Firm* — Winston Hsu

(57) ABSTRACT

A key storage device comprising a first key unit and a second key unit is disclosed. The first key unit is configured to output a first logic value through, comprising: a first setting circuit configured to output a first setting voltage; and a first inverter comprising a first output transistor having a first threshold voltage, configured to receive the first setting voltage and generate the first logic value. The second key unit is configured to output a second logic value through a second node, comprising: a second setting circuit configured to output a second setting voltage; and a second inverter comprising a second output transistor having a second threshold voltage, configured to receive the second setting voltage and generate the second logic value. The absolute value of first threshold voltage is lower than which of the second threshold voltage. The first setting voltage is higher than the second setting voltage.

20 Claims, 7 Drawing Sheets

(51) Int. Cl.
    *G11C 16/26*     (2006.01)
    *G11C 16/34*     (2006.01)

(56)     References Cited

U.S. PATENT DOCUMENTS

| | | |
|---|---|---|
| 9,806,881 B2 | 10/2017 | Kuenemund |
| 10,574,237 B2 | 2/2020 | Cocchi |
| 2004/0062083 A1* | 4/2004 | Layman ................ G11C 11/419 |
| | | 365/189.011 |
| 2020/0210628 A1 | 7/2020 | Karpinskyy |
| 2021/0280536 A1 | 9/2021 | Kuenemund |

* cited by examiner

KEY STORAGE DEVICE AND KEY GENERATION METHOD

CROSS REFERENCE TO RELATED APPLICATIONS

This application claims the benefit of U.S. Provisional Application No. 63/246,791, filed on Sep. 21, 2021. The content of the application is incorporated herein by reference.

BACKGROUND OF THE INVENTION

1. Field of the Invention

The present invention relates to a key storage device and a key generation method, and particularly relates to a key storage device and a key generation method which can provide keys for an electronic device or a circuit.

2. Description of the Prior Art

As technology greatly advances in these years, integrated circuits (ICs) are becoming more and more important for various kinds of electronic devices. Semiconductor industries always spend a lot of resources to develop IC design. However, reverse engineering of ICs is a serious threat to semiconductor industries, since it may be misused by an attacker to steal or pirate a circuit design. An attacker who successfully reverse engineers an IC can fabricate and sell a similar circuit, and illegally sell and reveal the design. Such reverse engineering can also be applied to chips.

Therefore, a mechanism for providing keys for preventing reverse engineering is needed.

SUMMARY OF THE INVENTION

One objective of the present invention is to provide a key storage device which can provide keys.

Another objective of the present invention is to provide a key generation method which can provide keys.

One embodiment of the present invention provides a key storage device comprising a first key unit and a second key unit. The first key unit is configured to output a first logic value through a first node, comprising: a first setting circuit configured to output a first setting voltage; and a first inverter comprising a first output transistor having a first threshold voltage, configured to receive the first setting voltage and generate the first logic value. The second key unit is configured to output a second logic value through a second node, comprising: a second setting circuit configured to output a second setting voltage; and a second inverter comprising a second output transistor having a second threshold voltage, configured to receive the second setting voltage and generate the second logic value. The first threshold voltage is lower than the second threshold voltage. The first setting voltage is higher than the second setting voltage.

Another embodiment of the present invention provides a key generation method, comprising: generating a first setting voltage by a first setting circuit; transmitting the first setting voltage to a first output transistor in a first inverter to generate a first logic value, wherein the first output transistor has a first threshold voltage; generating a second setting voltage by a second setting circuit; and transmitting the second setting voltage to a second output transistor in a second inverter to generate a second logic value, wherein the second output transistor has a second threshold voltage. The first threshold voltage is lower than the second threshold voltage. The first setting voltage is higher than the second setting voltage.

In view of above-mentioned embodiments, a mechanism for providing keys for preventing reverse engineering is provided. Such keys can further be used for other applications.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. The method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

Further, circuits in following embodiments comprise transistors, and NMOSs (NMOS transistors), PMOSs (PMOS transistors) are used as examples for explaining. Please note, in following embodiments, the descriptions "the first threshold voltage is lower than the second threshold voltage" for NMOSs or transistors with similar polarities, means "the first threshold voltage is lower than the second threshold voltage" and "an absolute value of the first threshold voltage is lower than an absolute value of the second threshold voltage". However, for PMOSs or transistors with similar polarities, "the first threshold voltage is lower than the second threshold voltage" means "an absolute value of the first threshold voltage is lower than an absolute value of the second threshold voltage". The definitions for threshold voltages of transistors are well known by persons skilled in the art, thus are omitted for brevity here.

Figure 1:
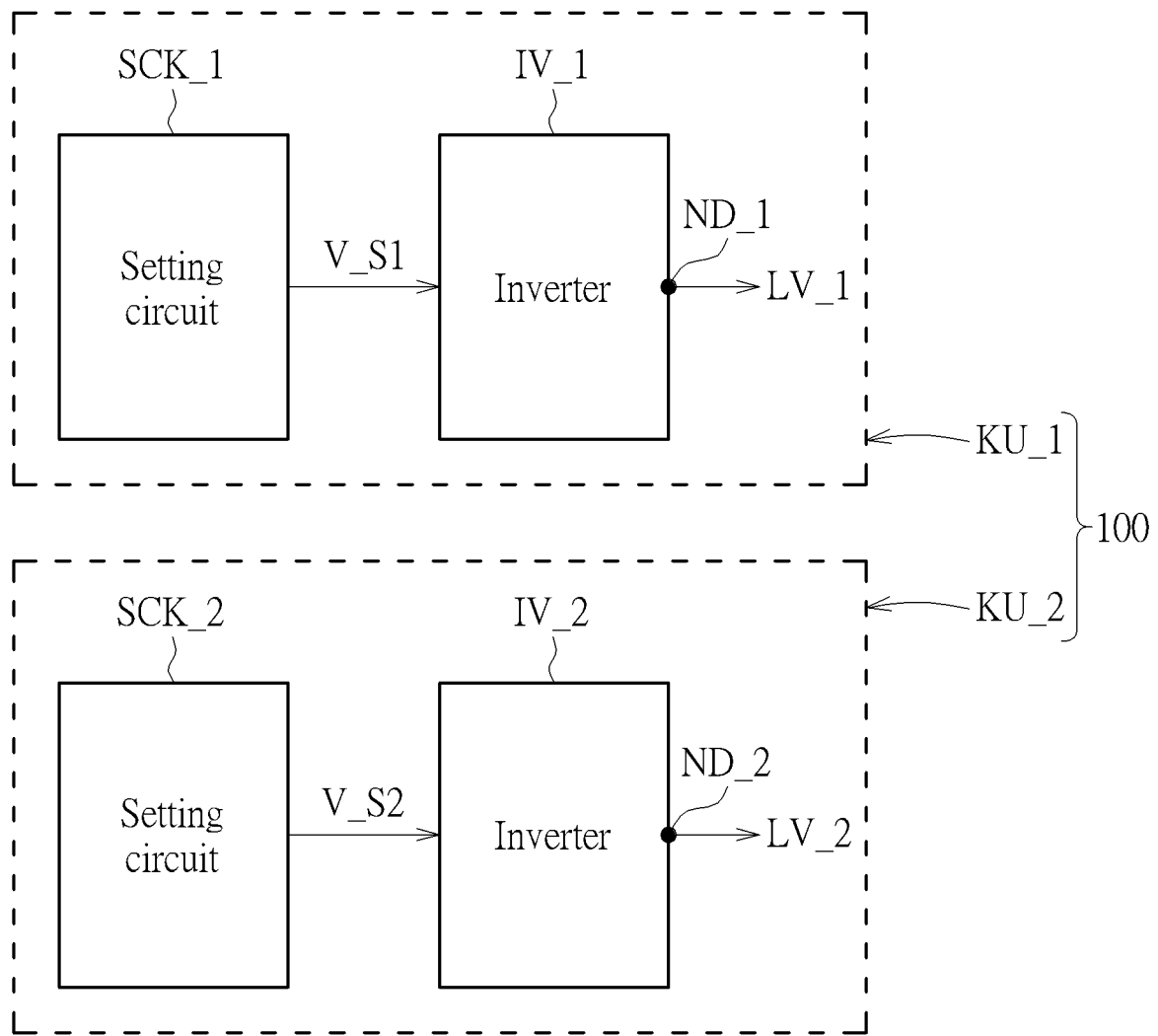
FIG. 1 is a block diagram illustrating a key storage device according to one embodiment of the present invention.

Further, the following "keys" can be provided in an IC or a chip and can be used for preventing reverse engineering. However, the keys can be provided in any other kind of electronic device and can be used for other applications, such as but not limited to authentication, coding data, or decoding data. FIG. 1 is a block diagram illustrating a key storage device 100 according to one embodiment of the present invention. As illustrated in FIG. 1, the key storage device 100 comprises a first key unit KU_1 and a second key unit KU_2. Please note the key storage device provided by the present invention can comprise other numbers of key units rather than limited to 2. The key units can be implemented by circuits.

The first key unit KU_1, which is configured to output a first logic value LV_1 through a first node ND_1, comprises a first setting circuit SCK_1 and a first inverter IV_1. The first setting circuit SCK_1 is configured to output a first setting voltage V_S1. The first inverter IV_1 is configured to receive the first setting voltage V_S1 and to generate the first logic value LV_1. In one embodiment, the first inverter IV_1 comprises a first output transistor having a first threshold voltage. The first output transistor, which will be described later, is configured to receive the first setting voltage V_S1 and generate the first logic value LV_1.

Similarly, the second key unit KU_2, which is configured to output a second logic value LV_2 through a second node ND_2, comprises a second setting circuit SCK_2 and a second inverter IV_2. The first logic value LV_1 and the second logic value LV_2 can be used as or used to generate the above-mentioned "keys". The second setting circuit SCK_2 is configured to output a second setting voltage V_S2. The second inverter IV_2 is configured to receive the second setting voltage V_S2 and to generate the second logic value LV_2. In one embodiment, the second inverter IV_2 comprises a second output transistor having a second threshold voltage. Details about the second output transistor will be described later. The second output transistor is configured to receive the second setting voltage V_S2 and to generate the second logic value LV_2. The above-mentioned first output transistor and second output transistor can be NMOSs or PMOSs.

The first threshold voltage is lower than the second threshold voltage. Further, in the embodiments of FIG. 2 and FIG. 3, the first setting voltage V_S1 is higher than the second setting voltage V_S2.

Several embodiments are provided in following descriptions to explain the concept of the present invention. Please note, for simplicity of illustration, some terminals or nodes stated in following descriptions are not symbolized in the drawings, but they can be clearly identified based on the drawings and related descriptions. Also, in following embodiments except the embodiment in FIG. 4, the above-mentioned first logic value LV_1 is low (e.g., 0) and the second logic value LV_2 is high (e.g., 1).

Figure 2:
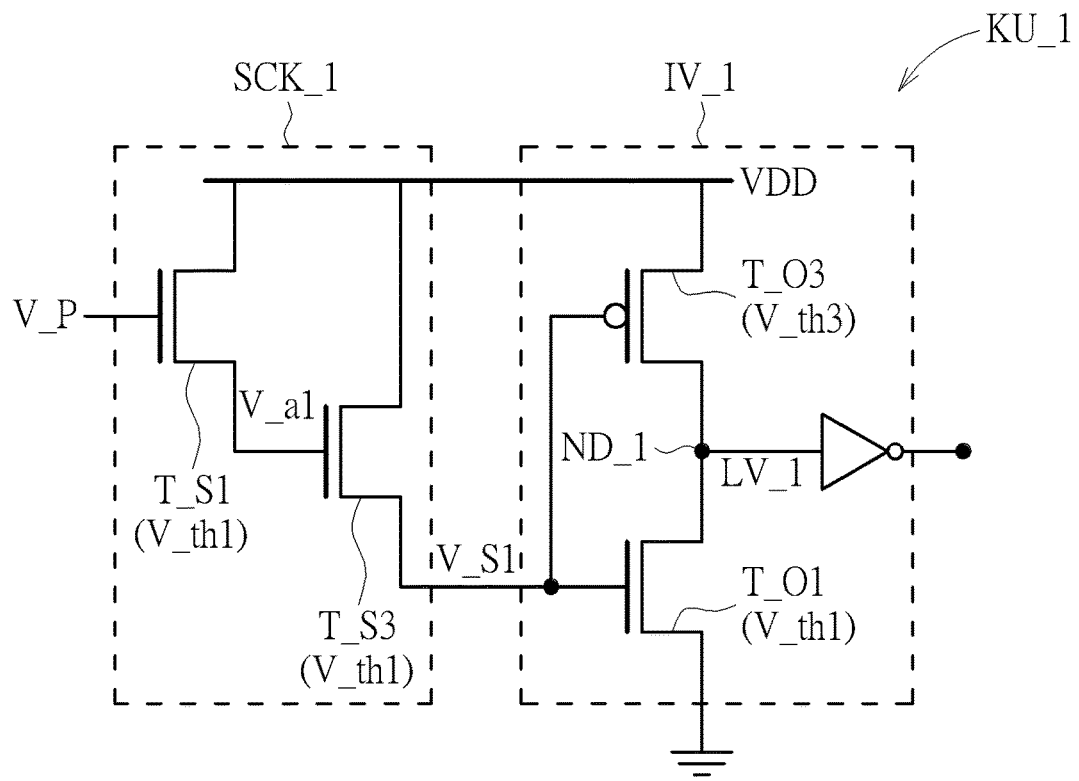
FIG. 2, FIG. 3, FIG. 4, FIG. 5, FIG. 6, FIG. 7, FIG. 8 and FIG. 9 are circuit diagrams for key storage devices according to different embodiments of the present invention.

The embodiment illustrated in FIG. 2 is an example of a detail circuitry of the first key unit KU_1 in FIG. 1. The first setting circuit SCK_1 in FIG. 2 comprises at least one setting stage (two setting stages in this embodiment). The setting stage (s) comprises a control terminal receiving a predetermined voltage VP and configured to generate the first setting voltage V_S1 according to the predetermined voltage V_P. For example, the first setting transistor T_S1 in the first setting circuit SCK_1 is served as a setting stage, which has a control terminal (gate) receiving a predetermined voltage V_P. Also, in such example, the predetermined voltage V_P is decreased by the first threshold voltage V_th1 to generate the voltage V_a1 via the first setting transistor T_S1. Also, the voltage V_a1 is decreased by the first threshold voltage V_th1 via the third setting transistor T_S3 in the first setting circuit SCK_1 to generate the first setting voltage V_S1. However, if the first setting circuit SCK_1 is to only comprise one setting stage, for example, the third setting transistor T_S3 is removed. In such case, the first setting transistor T_S3 has a control terminal (gate) receiving the predetermined voltage V_P and generates the voltage V_a1 as the first setting voltage V_S1. In one embodiment, the predetermined voltage V_P is equal to the first supply voltage VDD.

Figure 3:
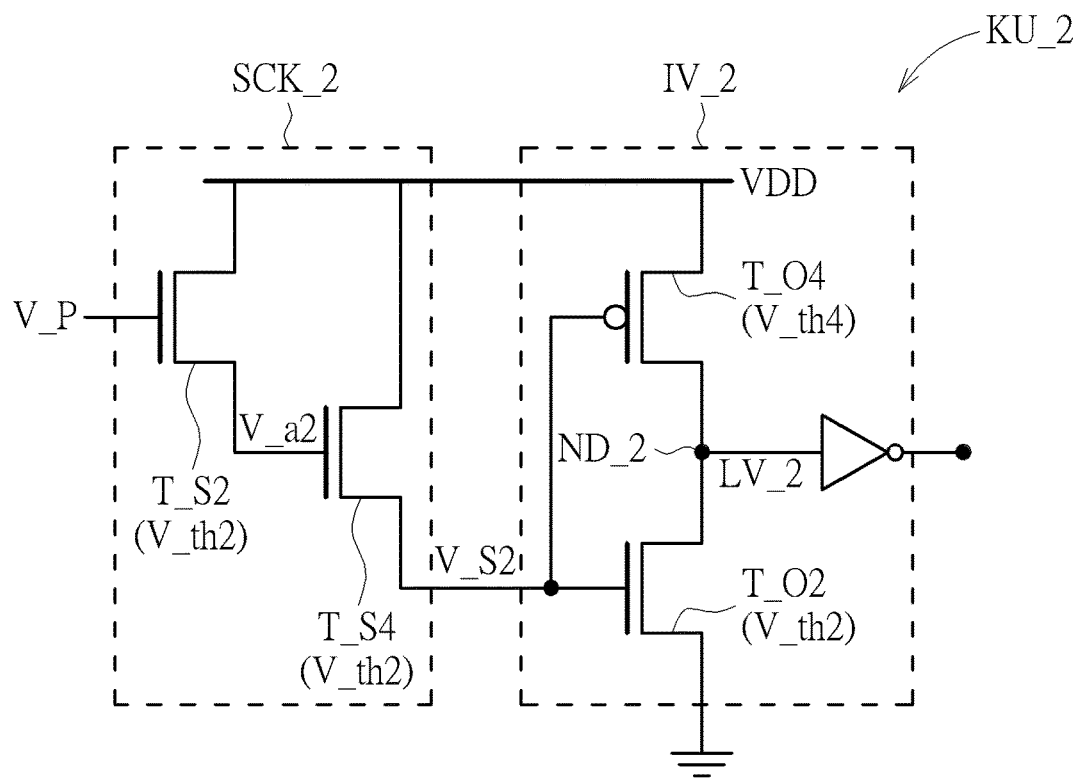

The embodiment illustrated in FIG. 3 is an example of a detail circuitry of the second key unit KU_2 in FIG. 1. The second key unit KU_2 in FIG. 3 has a circuit similar to that of the first key unit KU_1 in FIG. 2. For more detail, the second setting circuit SCK_2 in FIG. 3 comprises at least one setting stage. The setting stage (s) comprises a control terminal receiving a predetermined voltage V_P and configured to generate the second setting voltage V_S2 according to the predetermined voltage V_P. For example, in the embodiment of FIG. 3, the second setting transistor TS_2 in the second setting voltage V_S2 serves as a setting stage, which has a control terminal (gate) receiving a predetermined voltage V_P. Also, in such example, the predetermined voltage V_P is decreased by the second threshold voltage V_th2 to generate the voltage Va2 via the second setting transistor TS2. Also, the voltage V a2 is decreased by the second threshold voltage Vth2 via the fourth setting transistor T_S4 in the second setting circuit SCK_2 to generate the second setting voltage VS2. However, the second setting circuit SCK_2 can only comprise one setting stage, as illustrated in the descriptions of FIG. 2.

Please note, the numbers of the setting stages in the first setting circuit SCK_1 are not limited to 1 or 2. Therefore, in view of above-mentioned descriptions, the first setting circuit SCK_1 and the second setting circuit SCK_2 can respectively comprise a plurality of setting stages, wherein each of the setting stages comprises a setting transistor. A gate of the setting transistor in a first stage of the setting stages (e.g., the first setting transistor T_S1 in FIG. 2) receives the predetermined voltage V_P, a source of the setting transistor in the first stage is coupled to a gate of the setting transistor in a next stage (e.g., the third setting transistor T_S3 in FIG. 2), a gate of the setting transistor in a last stage (e.g., the third setting transistor T_S3 in FIG. 2) is coupled to a source of the setting transistor in a previous stage (e.g., the first setting transistor T_S1 in FIG. 2), and a source of the setting transistor in a last stage outputs the first setting voltage V_S1 or the second setting voltage V_S2. The second setting circuit SCK_2 follow the same rules as well.

In FIG. 2, the first inverter IV_1 comprises the above-mentioned first output transistor T_O1 and a third output transistor T_O3. Also, in FIG. 3, the second inverter IV_2 further comprises the above-mentioned second output transistor T_O2 and a fourth output transistor T_O4. The third output transistor T_O3 has a third threshold voltage V_th3, and comprises a first terminal coupled to a first supply voltage VDD, a second terminal coupled to the first node ND_1, and a control terminal configured to receive the first setting voltage V_S1. The fourth output transistor T_O4 has a fourth threshold voltage V_th4, and comprises a first terminal coupled to the first supply voltage VDD, a second terminal coupled to the second node ND_2 and a control terminal configured to receive the second setting voltage V_S2.

In one embodiment, the third threshold voltage V_th3 is equal to or higher than the fourth threshold voltage V_th4. In another embodiment, the third threshold voltage V_th3 is equal to or higher than the first threshold voltage V_th1, and the fourth threshold voltage V_th4 is equal to or lower than the second threshold voltage V_th2. The voltage levels of threshold voltages can be set by various methods. In one embodiment, the voltage levels of threshold voltages are set by providing ion dopant with different dopant concentrations to different transistors. Since the dopant concentration is hard to be analyzed by reverse engineering, an attacker who tries to pirate a circuit design may see the circuits in the IC have the same physical circuit configuration and layout structure, but could not know the dopant concentrations thereof, thus he still could not successfully reproduce the IC.

Please refer to FIG. 2 and FIG. 3 again, the first output transistor T_O1 comprises a first terminal coupled to the first node ND_1, a second terminal coupled to a second supply voltage (GND in this example), and a control terminal configured to receive the first setting voltage V_S1. The second output transistor T_O2 comprises a first terminal coupled to the second node ND_2, a second terminal coupled to the second supply voltage (GND in this example), and a control terminal configured to receive the second setting voltage V_S2.

In the embodiment of FIG. 2, the first setting voltage V_S1 is set to be high due to the lower first threshold voltage V_th1 of the first setting circuit SCK_1. Also, the first output transistor T_O1 is an NMOS and the third output transistor T_O3 is a PMOS. The Vsg of the third output transistor T_O3 is equal to a first voltage difference between the first supply voltage VDD and the first setting voltage V_S1. Additionally, the Vgs of the first output transistor T_O1 is equal to a second voltage difference between the first setting voltage V_S1 and the second supply voltage GND. Therefore, the second voltage difference is larger than the first voltage difference since the first setting voltage V_S1 is high. In such case, a difference between the first voltage difference and an absolute value of the third threshold voltage V_th3 is smaller than a difference between the second voltage difference and the first threshold voltage V_th1 (i.e. (VDD−V_S1)−|V_th3|<(V_S1−0)−Vth1), since the absolute value of the third threshold voltage V_th3 is equal to or higher than the first threshold voltage V_th1. Accordingly, in a non-steady state, the first output transistor T_O1 outputs a larger current and the third output transistor T_O3 outputs a smaller current. After the first key unit KU_1 enters a steady state, the currents flowing through the first output transistor T_O1 and the third output transistor T_O3 become the same.

The above-mentioned difference between the first voltage difference and the third threshold voltage V_th3 and the difference between the second voltage difference and the first threshold voltage V_th1 correspond to the resistances of the first output transistor T_O1 and the third output transistor T_O3. Therefore, the embodiment in FIG. 2 can be stated as: the first setting voltage V_S1 is set to be high due to the lower first threshold voltage V_th1 of the first setting circuit SCK_1, thereby the third output transistor T_O3 has a higher resistance and the first output transistor T_O1 has a lower resistance. By this way, the first logic value LV_1 is low via dividing the voltage VDD through the first output transistor T_O1 and the third output transistor T_O3.

The second inverter IV_2 in FIG. 3 has opposite operations. In the embodiment of FIG. 3, the second setting voltage V_S2 is set to be low due to the higher second threshold voltage V_th2 of the second setting circuit SCK_2. Also, the second output transistor T_O2 is an NMOS and the fourth output transistor T_O4 is a PMOS. The Vsg of the fourth output transistor T_O4 is equal to a third voltage difference between the first supply voltage VDD and the second setting voltage V_S2. Additionally, the Vgs of the second output transistor T_O2 is equal to a fourth voltage difference between the second setting voltage V_S2 and the second supply voltage GND. Therefore, the fourth voltage difference is smaller than the third voltage difference since the second setting voltage V_S2 is low. In such case, a difference between the third voltage difference and the fourth threshold voltage V_th4 is larger than a difference between the fourth voltage difference and the second threshold voltage V_th2 (i.e. (VDD−V_S2)−|V_th4|>(V_S2−0)−Vth2), since the fourth threshold voltage V_th4 is equal to or lower than the second threshold voltage V_th2. Accordingly, in a non-steady state, the fourth output transistor T_O4 outputs a larger current and the second output transistor T_O2 outputs a smaller current. After the second key unit KU_2 enters a steady state, the currents flowing through the second output transistor T_O2 and the fourth output transistor T_O4 become the same.

The above-mentioned difference between the third voltage difference and the fourth threshold voltage V_th4 and the difference between the fourth voltage difference and the second threshold voltage V_th2 correspond to the resistances of the second output transistor T_O2 and the fourth output transistor T_O4. Therefore, the embodiment in FIG. 3 can be stated as: the second setting voltage V_S2 is set to be low due to the higher second threshold voltages V_th2 of the second setting circuit SCK_2, thereby the fourth output transistor T_O4 has a lower resistance and the second output transistor T_O1 has a higher resistance. By this way, the second logic value LV_2 is high via dividing the voltage VDD through the second output transistor T_O2 and the fourth output transistor T_O4. Further, in the embodiments of FIG. 2 and FIG. 3, a resistance of the first output transistor T_O1 (first resistance) is lower than a resistance of the second output transistor T_O2 (second resistance).

As above-mentioned, in the embodiments of FIG. 2, FIG. 3, the setting transistors in the first setting circuit SCK_1 and the second setting circuit SCK_2 are NMOSs. Therefore, the setting stages of the first setting circuit SCK_1 and the second setting circuit SCK_2 decrease the predetermined voltage V_P stage by stage. Thus, following the rules depicted in FIG. 2 and FIG. 3, the first setting voltage V_S1 is high, the second setting voltage V_S2 is low, the first logic value LV_1 is low and the second logic value LV_2 is high.

Figure 4:
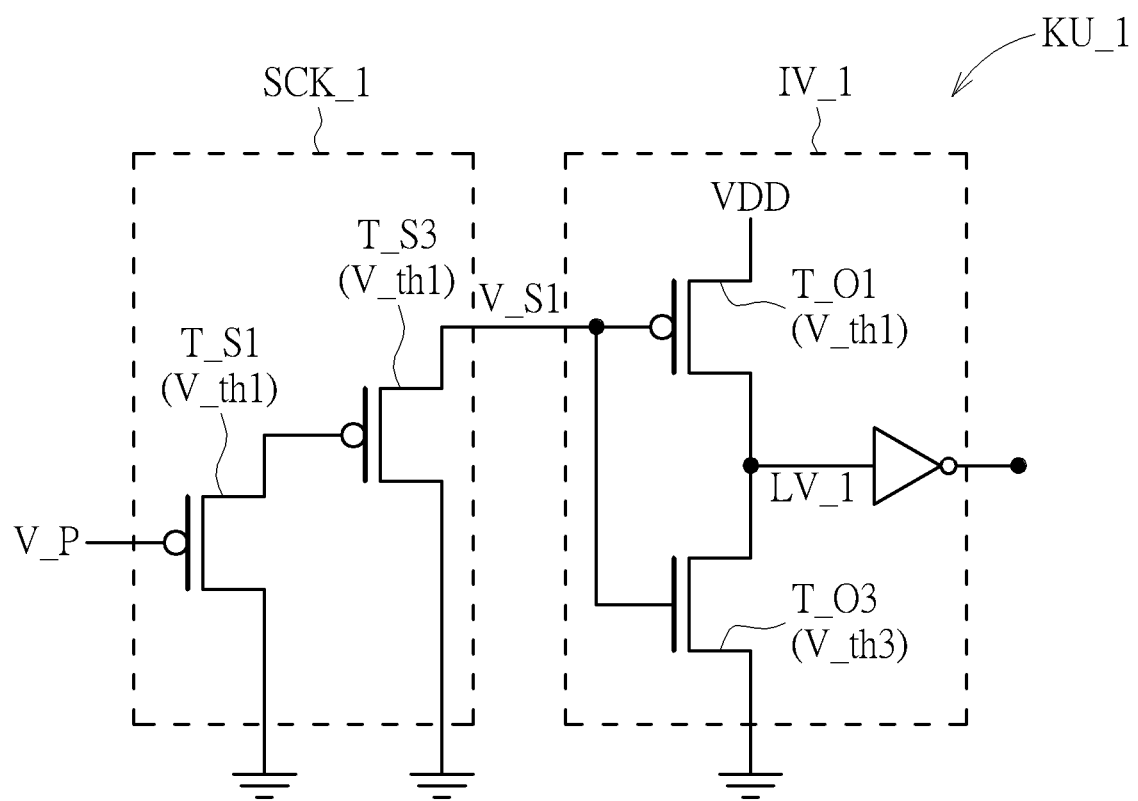

However, in another embodiment, the setting transistors in the setting stages can be replaced with PMOSs. FIG. 4 is a circuit diagram for a key storage device according to another embodiment of the present invention. As illustrated in FIG. 4, the first setting transistor T_S1 and the third setting transistor T_S3 are PMOSs having the first threshold voltage V_th1, the first output transistor T_O1 is a PMOS having the first threshold voltage V_th1, and the third output transistor T_O3 is an NMOS having the third threshold voltage V_th3. Also, the connections of the first setting transistor T_S1 and the third setting transistor T_S3 in FIG. 4 are different from that of FIG. 2.

The second setting transistor T_S2 and the fourth setting transistor T_S4 of the second key unit KU_2 in FIG. 3 can also be replaced by PMOSs, following the rules illustrated in FIG. 4. However, in such example, the second setting transistor T_S2 and the fourth setting transistor T_S4 have the fourth threshold voltage V_th4, the second output transistor T_O2 is a PMOS having the second threshold voltage V_th2, and the fourth output transistor T_O4 is an NMOS having the fourth threshold voltage V_th4. In the embodiments that the setting transistors are replaced with PMOSs, the setting stages of the first setting circuit SCK_1 and the second setting circuit SCK_2 increase the predetermined voltage stage by stage. As above-mentioned, the first threshold voltage V_th1 is lower than the second threshold voltage V_th2. Therefore, in the embodiments that the setting transistors and the output transistors are replaced with PMOSs, the first setting voltage V_S1 is lower and the second setting voltage V_S2 is higher. Accordingly, according to the rules depicted in FIG. 2 and FIG. 3, the first logic value LV_1 is high and the second logic value LV_2 is low.

As described above, the first node ND_1 and the second node ND_2 in the embodiments of FIG. 2, FIG. 3, and FIG. 4 are pulled up or pulled down via the difference in currents flowing through the first inverter IV_1 or the second inverter IV_2. In one embodiment, an inverter can further be provided to the first node ND_1 or the second node ND_2, to enhance the voltage transitions at the first node ND_1 and the second node ND_2. In other words, the voltage difference between logic high and logic low can be increased.

Figure 5:
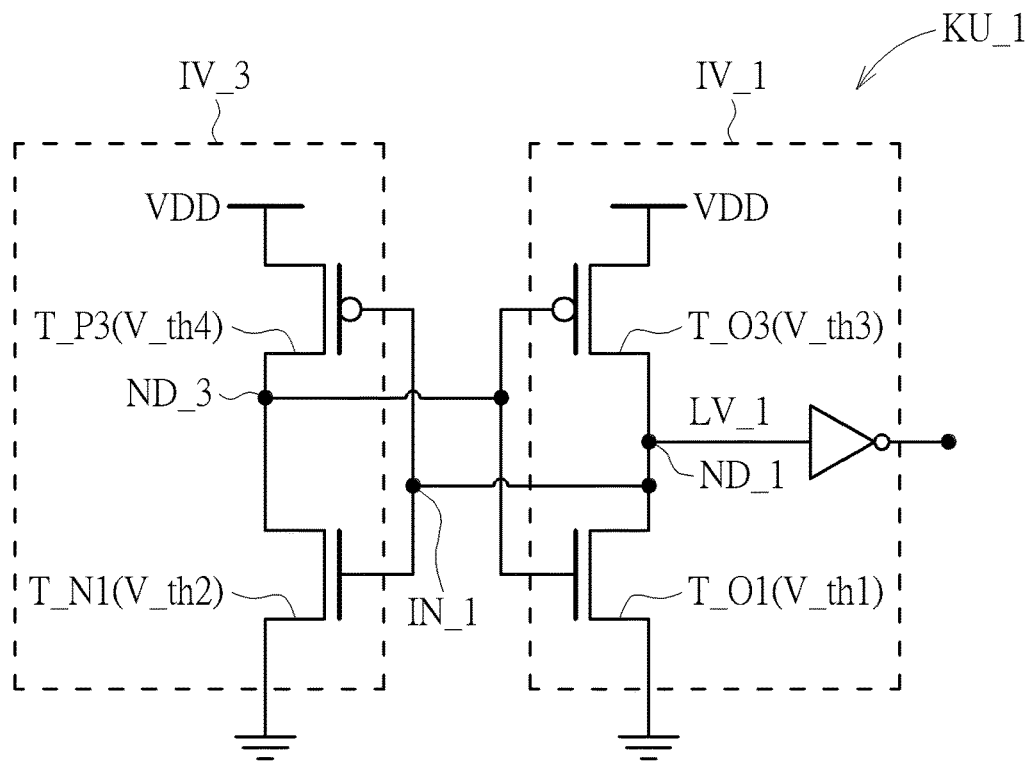
Figure 6:
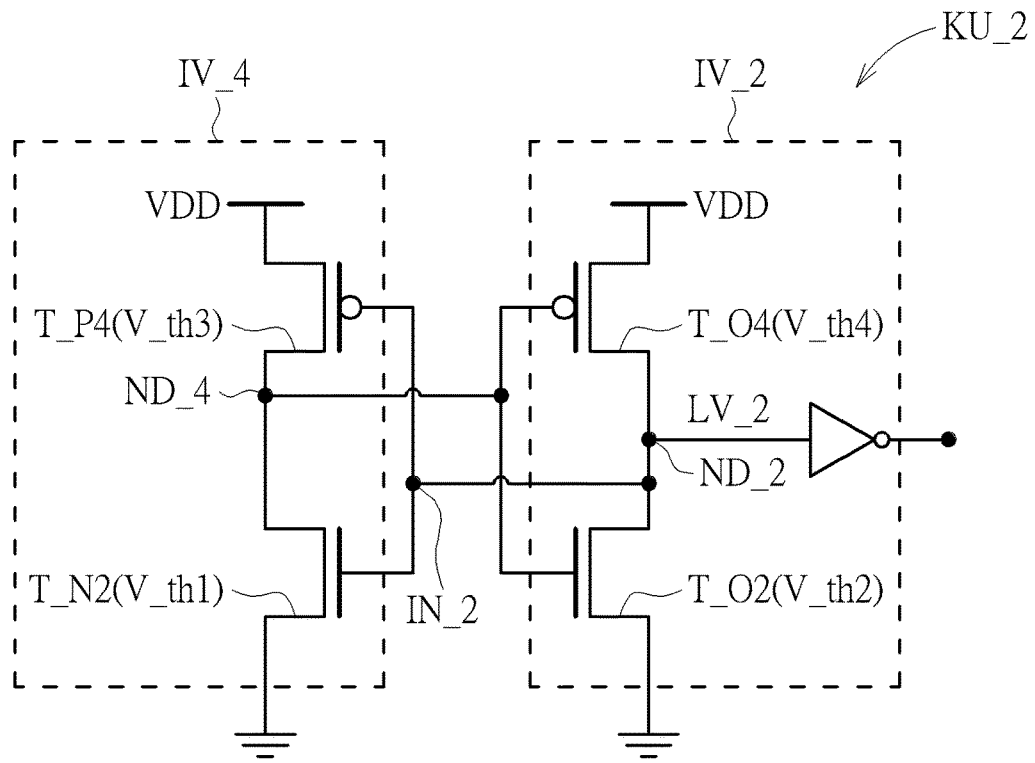

The first setting circuit SCK_1 and the second setting circuit SCK_2 in FIG. 1 can have other circuitries rather than limited to the circuitries illustrated in FIG. 2, FIG. 3 and FIG. 4. FIG. 5 and FIG. 6 are circuit diagrams for key storage devices according to different embodiments of the present invention. The circuitries in FIG. 5 and FIG. 6 can be called as SRAM like structures. In FIG. 5, the first setting circuit SCK_1 is a third inverter IV_3. Also, in FIG. 6, the second setting circuit SCK_2 is a fourth inverter IV_4. The third inverter IV3 comprises a first setting transistor T_N1 having the second threshold voltage V_th2, and comprises a first input node IN_1 coupled to the first node ND_1. The third inverter IV3 is configured to output the first setting voltage V_S1, higher than half of the first supply voltage VDD, to the first inverter IV_1 through a third node ND_3. The fourth inverter IV4 comprises a second setting transistor T_N2 having the first threshold voltage V_th1, and comprises a second input node IN_2 coupled to the second node ND_2. The fourth inverter IV4 is configured to output the second setting voltage V_S2, lower than half of the first supply voltage VDD, to the second inverter IV2 through a fourth node ND_4. In the embodiments of FIG. 5, FIG. 6, the first setting transistor T_N1 and the second setting transistors TN_2 are NMOSs. In the embodiment of FIG. 5, the third output transistor T_O3 is a first PMOS having the third threshold voltage V_th3, comprises a drain coupled to the first node ND_1 and comprises a gate coupled to the third node ND_3. In the same embodiment, the third inverter IV_3 further comprises a third PMOS T_P3 having the fourth threshold voltage V_th4, comprises a drain coupled to the third node ND_3 and comprises a gate coupled to the first input node ND_1.

Also, in the embodiment of FIG. 6, the fourth output transistor T_O4 is a second PMOS having the fourth threshold voltage V_th4, comprises a drain coupled to the second node ND_2 and comprises a gate coupled to the fourth node ND_4. In the same embodiment, the fourth output transistor T_O4 comprises a fourth PMOS T_P4 having the third threshold voltage V_th3, comprises a drain coupled to the fourth node ND_4 and comprises a gate coupled to the second input node ND_2. An absolute value of the fourth threshold voltage V_th4 is lower than an absolute value of the third threshold voltage V_th3. In other words, the threshold voltage of the third PMOS T_P3 is lower than the threshold voltage of the fourth PMOS T_P4. Additionally, in one embodiment, the third threshold voltage V_th3 is equal to or higher than the first threshold voltage V_th1, the fourth threshold voltage V_th4 is equal to or lower than the second threshold voltage V_th2, and the first threshold voltage V_th1 is lower than the second threshold voltage V_th2.

Figure 7:
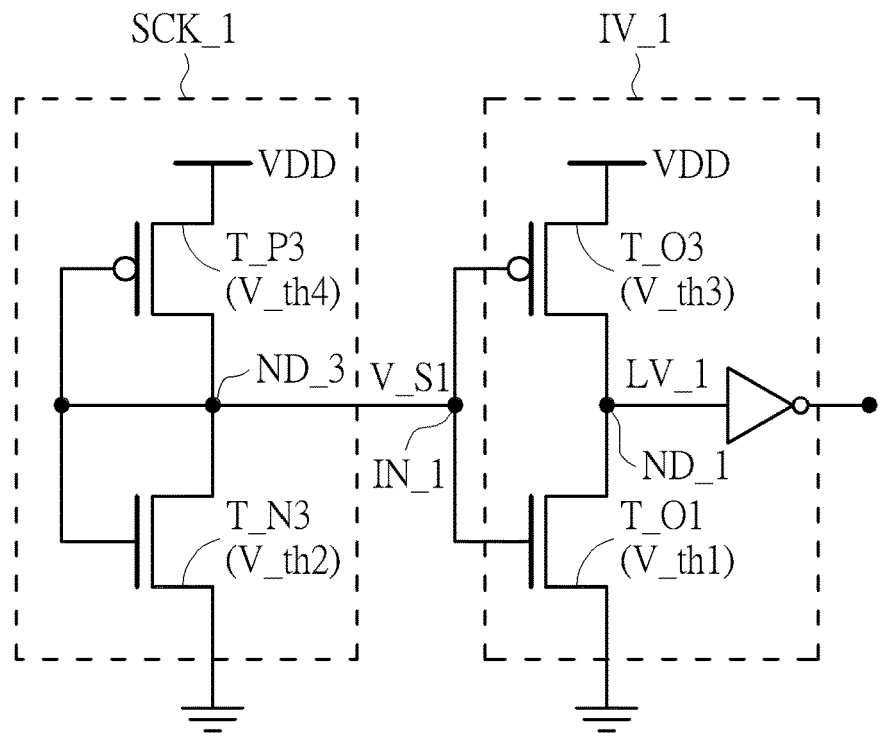
Figure 8:
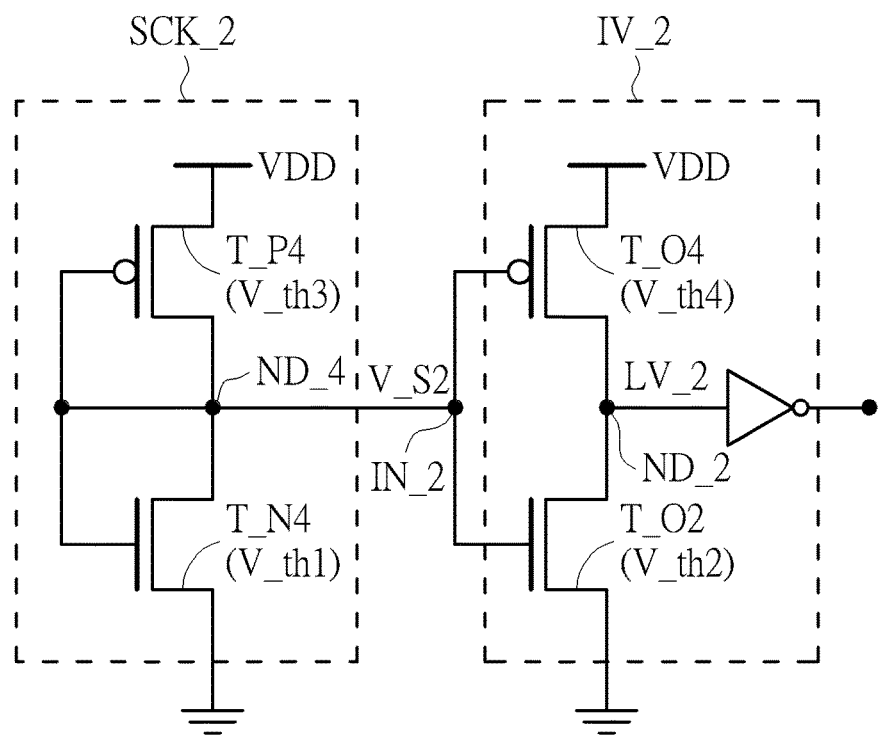

FIG. 7 and FIG. 8 are circuit diagrams for key storage devices according to different embodiments of the present invention. In the embodiment of FIG. 7, the circuitry and the threshold voltages of the first inverter IV 1 is the same as that of the first inverter IV_1 in FIG. 2, thus descriptions thereof are omitted for brevity here. In the same embodiment, the first setting circuit SCK_1 comprises a third NMOS TN3 and a third PMOS TP3. The third NMOS TN3 has the second threshold voltage Vth2, comprises a drain for outputting the first setting voltage V_S1 through a third node ND_3. The third PMOS T_P3 has the fourth threshold voltage Vth4. The drain and a gate of the third NMOS TN3 are shorted with a drain and a gate of the third PMOS TP3. In other words, a first input node IN 1 of the first inverter IV 1 is connected with the third node ND_3.

Also, in the embodiment of FIG. 8, the circuitry and the threshold voltages of the second inverter IV_2 is the same as that of the second inverter IV_2 in FIG. 3, thus descriptions thereof are omitted for brevity here. In the same embodiment, the second setting circuit SCK_2 comprises a fourth NMOS T_N4 and a fourth [PMOS T_P4]. The fourth NMOS T_N4 has the first threshold voltage V_th1, comprises a drain for outputting the second setting voltage VS_2. The fourth PMOS [T_P4] has the third threshold voltage V_th3. The drain and a gate of the fourth NMOS T_N4 are shorted with a drain and a gate of the fourth PMOS T_P4. In other words, a second input node IN_2 of the second inverter IV_2 is connected with the fourth node ND_4.

An absolute value of the fourth threshold voltage V_th4 is lower than an absolute value of the third threshold voltage V_th3. In other words, the threshold voltage of the fourth PMOS T_P4 is lower than the threshold voltage of the third PMOS T_P3. Additionally, in one embodiment, the third threshold voltage V_th3 is equal to or higher than the first threshold voltage V_th1, the fourth threshold voltage V_th4 is equal to or lower than the second threshold voltage V_th2, and the first threshold voltage V_th1 is lower than the second threshold voltage V_th2.

Figure 9:
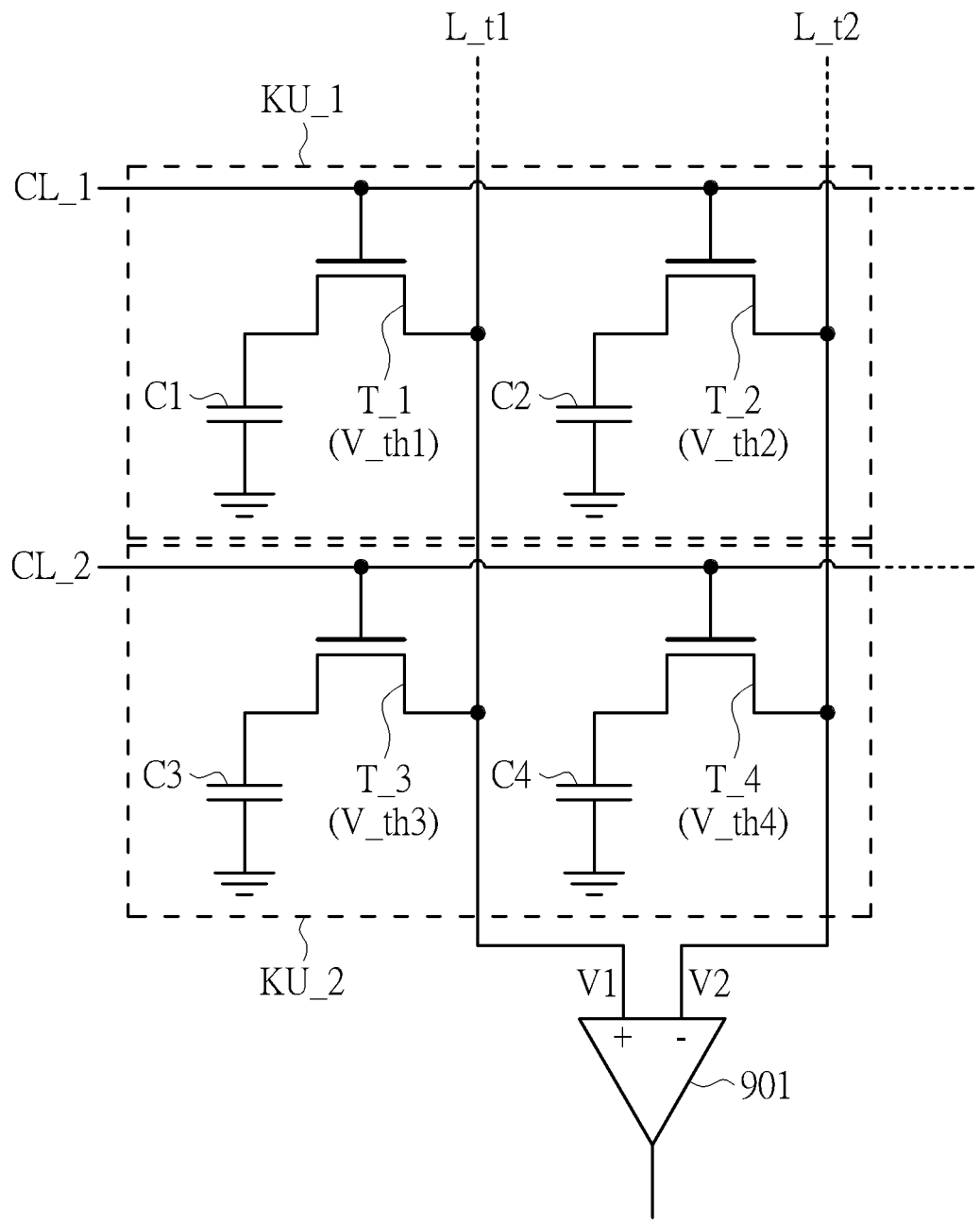

In the embodiments of FIG. 2, FIG. 3, FIG. 4, the predetermined voltage level V_P input to the control terminal of the setting transistor is a constant value, and does not change even after a period of time. Also, the control terminals of the transistors in FIG. 5, FIG. 6, FIG. 7, and FIG. 8 do not receive any changeable signals from outside. Therefore, in above-mentioned embodiments, voltages at each terminal of components of the first key unit KU_1 and the second key unit KU_2 are fixed values after the first key unit KU_1 and the second key unit KU_2 enter a steady state. The key unit provided by the present invention is not limited to comprise the setting circuit and the inverter illustrated in FIG. 1. The key unit can be implemented by other circuitries. FIG. 9 is a circuit diagram for a key storage device according to another embodiment of the present invention. The circuitry illustrated in FIG. 9 can be called a DRAM like structure.

As illustrated in FIG. 9, the first key unit KU_1 comprises a first transistor T_1, a second transistor T_2, a first capacitor C1, and a second capacitor C2. Each of the first transistor T_1 and the second transistor T_2 comprises a first terminal, respectively coupled to one terminal of a first capacitor C1 and a second capacitor C2, a second terminal, respectively coupled to a first transmission line L_t1 and a second transmission line L_t2, and a control terminal coupled to a first control line CL_1. Another terminal of the first capacitor C1 and the second capacitor C2 are coupled to a ground terminal. The first transmission line L_t1 and the second transmission line L_t2 can be called as bit lines. The first transistor T_1, which has the first threshold voltage V_th1, is configured to charge the first capacitor C1 in a first mode according to a control voltage provided by the first control line CL_1 and a first charging voltage provided by the first transmission line L_t1. The first mode can be called as a pre-charge mode. The second transistor T_2, which has the second threshold voltage V_th2, is configured to charge the second capacitor C2 in the first mode according to a control voltage provided by the first control line CL_1 and a second charging voltage provided by the second transmission line L_t2.

The comparator 901 is configured to compare a first voltage V1 of the first capacitor C1 and a second voltage V2 of the second capacitor C2 via the first transmission line L_t1 and the second transmission line L_t2, to output a comparing result in a second mode. The second mode can be called as a read mode.

In one embodiment, after the first capacitor C1 and the second capacitor C2 are pre-charged in the first mode, the first key unit KU_1 further operates in a third mode following the first mode and before the second mode. The third mode can be called as an idle mode.

In one embodiment, the voltage provided by the first transmission line L_t1 and the second transmission line L_t2 in the first mode is the supply voltages VDD, and the voltage provided by the first transmission line L_t1 and the second transmission line L_t2 in the third mode is 0 (i.e., ground). Further, in the second mode, the first transmission line L_t1 and the second transmission line L_t2 do not provide voltages. In such case, the voltage of the first transmission line L_t1 correspond to voltages of the first capacitor C1 and the third capacitor C3, and the voltage of the second transmission line L_t2 correspond to voltages of the second capacitor C2 and the fourth capacitor C4.

Further, in one embodiment, the voltages provided by the first control line CL_1 and the second control line CL_2 in the first mode and the second mode are the supply voltages VDD, and the voltage provided by the first transmission line L_t1 and the second transmission line L_t2 in the third mode is 0 (i.e., ground).

The control voltage is set to be a turn off voltage of the first transistor T_1 and the second transistor T_2 in the third mode. However, in the third mode, the first transistor T_1 may still have leakage currents, which flow from the first capacitor C1 to the first transmission line L_t1. Similarly, the second transistor T_2 may still have leakage currents, which flow from the second capacitor C2 to the second transmission line L_t2.

As stated in the above-mentioned embodiments, the first threshold voltage V_th1 is lower than the second threshold voltage V_th2. Therefore, the leakage currents of the first transistor T_1 are larger than the leakage currents of the second transistor T_2. Thus, the first voltage V1 is lower than the second voltage V2 in the third mode, thereby the comparator 901 outputs the first logic value (0 in this embodiment).

Also, in FIG. 9, the second key unit KU_2 comprises a third transistor T_3, a fourth transistor T_4, a third capacitor C3, and a fourth capacitor C4. The circuit connections and the operations of the second key unit KU_2 is similar with those of the first key unit KU_1. However, the third transistor T_3 has the third threshold voltage V_th3 and the fourth transistor T_4 has the fourth threshold voltage V_th4 lower than the third threshold voltage V_th3. Therefore, the leakage currents of the third transistor T_3 are smaller than the leakage currents of the fourth transistor T_4. Thus, the first voltage V1 transmitted by the third capacitor C3 is larger than the second voltage V2 transmitted by the fourth capacitor C4, when the comparator reads capacitors in the second key unit KU_2 in the third mode, thereby the comparator 901 outputs the second logic value (1 in this embodiment). In one embodiment, the first threshold voltage V_th1 is equal to the fourth threshold voltage V_th4, and the second threshold voltage V_th2 is equal to the third threshold voltage V_th3.

In one embodiment, the first key unit KU_1 and the second key unit KU_2 switch to the second mode rather than the third mode after the first mode is completed. In other words, the first key unit KU_1 and the second key unit KU_2 are read after pre-charged without idling. In such case, the current from the first transistor T_1 is larger than the current from the second transistor T_2 since the first transistor T_1 has a lower threshold voltage. Therefore, the first voltage V1 is higher than the second voltage V2 since it increases quicker than the second voltage V2. Accordingly, in such embodiment, the comparator 901 outputs the second logic value (1 in this embodiment) in the third mode. Following the same rules, the comparator 901 outputs the first logic value (0 in this embodiment) when read the voltages from the third capacitor C3 and the fourth capacitor C4 in the third mode.

It will be appreciated, for the convenience of explaining, the first transmission line L_t1, second transmission line L_t2 are adjacent to each other, and the first control line CL_1, the second control line CL_2 are adjacent to each other in the embodiment of FIG. 9. However, it does not mean to limit the scope of the present invention. The first transmission line L_t1, second transmission line L_t2 can be selected by providing voltages to the transmission lines to be used. In other words, at least one transmission line or any other wire line can exist between the first transmission line L_t1 and the second transmission line L_t2. Following the same rule, at least one transmission line or any other wire line can exist between the first control line CL_1 and the second control line CL_2.

Please note, the above-mentioned embodiments can be combined. For example, the embodiments illustrated in FIG. 2, FIG. 3 and FIG. 5 can be applied as the key units provided in an IC. Further, in view of above-mentioned embodiments, physical circuit configurations of the first key unit KU_1 and the second key unit KU_2 are identical, but the first key unit KU_1 and the second key unit KU_2 output different logic values while operating at the same supply voltages VDD and GND, since the transistors in the first key unit KU_1 and the second key unit KU_2 have different threshold voltage arrangements. For example, in FIG. 2 and FIG. 3, the physical circuit configuration of the first key unit KU_1 and the second key unit KU_2 are the same and the first key unit KU_1 and the second key unit KU_2 both receives the predetermined voltage V_P and operate under the first supply voltage VDD and the second supply voltage GND. However, the first key unit KU_1 outputs the logic value 0 but the second key unit KU_2 outputs the logic value 1, due to the different threshold voltage arrangements of the transistors therein.

In one embodiment, an error correction mechanism can be provided to improve the stability of the keys stored in the key units. For example, BCH (Bose Chaudhuri Hocquenghem) codes can be used for the error correction of the keys. Additionally, majority voting can also be used to improve the stability of the keys.

Figure 10:
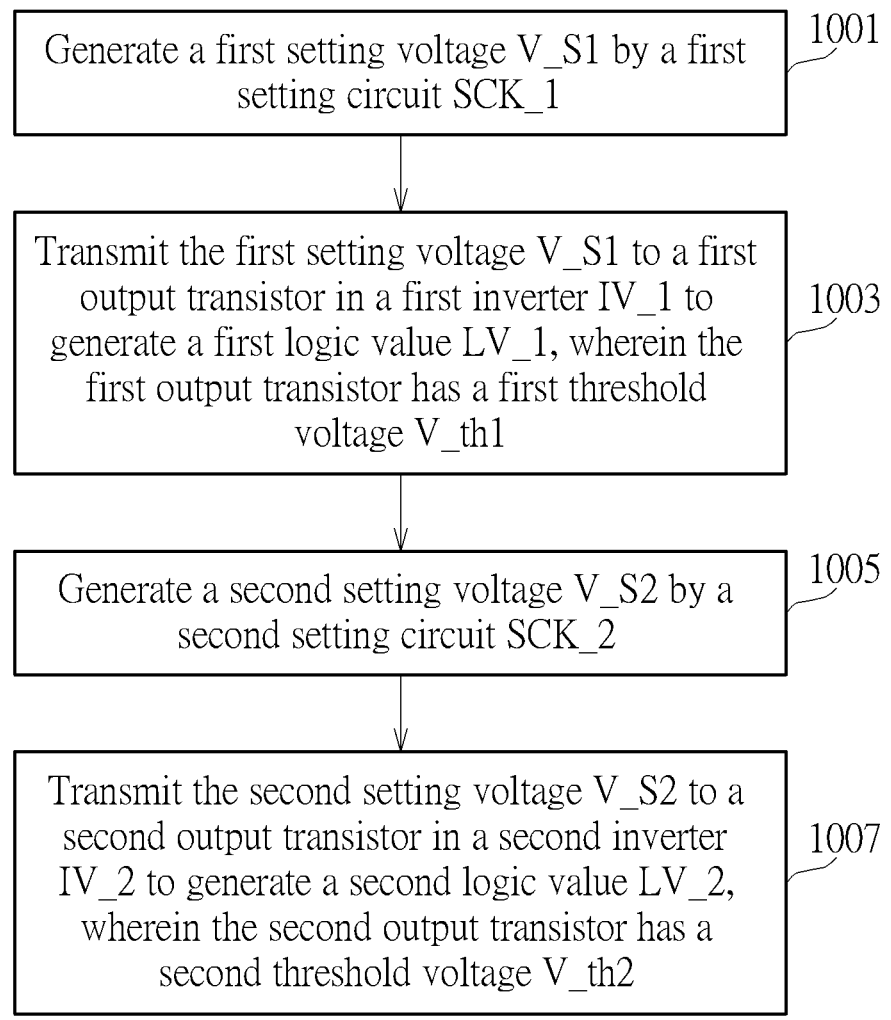
FIG. 10 is a flow chart illustrating a key generation method according to one embodiment of the present invention.

Based upon above-mentioned embodiments, a key generation method can be acquired. FIG. 10 is a flow chart illustrating a key generation method according to one embodiment of the present invention, which corresponds to the embodiments illustrated in FIG. 1, and comprises following steps:

Step 1001

Generate a first setting voltage V_S1 by a first setting circuit SCK_1.

Step 1003

Transmit the first setting voltage V_S1 to a first output transistor in a first inverter IV_1 to generate a first logic value LV_1, wherein the first output transistor has a first threshold voltage V_th1.

Step 1005

Generate a second setting voltage V_S2 by a second setting circuit SCK_2.

Step 1007

Transmit the second setting voltage V_S2 to a second output transistor in a second inverter IV_2 to generate a second logic value LV_2, wherein the second output transistor has a second threshold voltage V_th2.

The first threshold voltage V_th1 is lower than the second threshold voltage V_th2, and the first setting voltage V_S1 is higher than the second setting voltage V_S2. Other detail steps can be acquired in view of above-mentioned descriptions, thus are omitted for brevity here.

In view of above-mentioned embodiments, a mechanism for providing keys for reverse engineering is provided. Such keys can further be used for other applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A key storage device, comprising:
a first key unit, configured to output a first logic value through a first node, comprising:
a first setting circuit configured to output a first setting voltage; and
a first inverter comprising a first output transistor having a first threshold voltage, configured to receive the first setting voltage and generate the first logic value; and
a second key unit, configured to output a second logic value through a second node, comprising:
a second setting circuit configured to output a second setting voltage; and
a second inverter comprising a second output transistor having a second threshold voltage, configured to receive the second setting voltage and generate the second logic value,
wherein an absolute value of the first threshold voltage is lower than an absolute value of the second threshold voltage,
wherein the first setting voltage is higher than the second setting voltage, and
wherein the first setting circuit and the second setting circuit comprises a first setting transistor and a second setting transistor, respectively, receiving a constant voltage at a control terminal.

2. The key storage device of claim 1, wherein a first resistance of the first output transistor is lower than a second resistance of the second output transistor.

3. The key storage device of claim 1,
wherein the first setting circuit and the second setting circuit respectively comprises at least one setting stage;
wherein a first of the at least one setting stage of the first setting circuit and a first of the at least one setting stage of the second setting circuit comprises the first and second setting transistor, respectively, and is configured to generate the first setting voltage and the second setting voltage, respectively, according to the constant voltage.

4. The key storage device of claim 3, wherein each of the at least one setting stage of the first setting circuit comprises a transistor having the first threshold voltage, wherein each of the at least one setting stage of the second setting circuit comprises a transistor having the second threshold voltage.

5. The key storage device of claim 4,
wherein the first inverter further comprises a third output transistor having a third threshold voltage, and comprising a first terminal coupled to a first supply voltage, a second terminal coupled to the first node, and a control terminal configured to receive the first setting voltage;
wherein the second inverter further comprises a fourth output transistor having a fourth threshold voltage, and comprising a first terminal coupled to the first supply voltage, a second terminal coupled to the second node and a control terminal configured to receive the second setting voltage;
wherein the first output transistor comprises a first terminal coupled to the first node, a second terminal coupled to a second supply voltage, and a control terminal configured to receive the first setting voltage;
wherein a difference between the first supply voltage and the first setting voltage is equal to a first voltage difference, and a difference between the first setting voltage and the second supply voltage is equal to a second voltage difference,
wherein a difference between the first voltage difference and an absolute value of the third threshold voltage is smaller than a difference between the second voltage difference and the absolute value of the first threshold voltage.

6. The key storage device of claim 5,
wherein the second output transistor comprises a first terminal coupled to the second node, a second terminal coupled to the second supply voltage, and a control terminal configured to receive the second setting voltage;
wherein a difference between the first supply voltage and the second setting voltage is equal to a third voltage difference, and a difference between the second setting voltage and the second supply voltage is equal to a fourth voltage difference,
wherein a difference between the third voltage difference and an absolute value of the fourth threshold voltage is larger than a difference between the fourth voltage difference and the absolute value of the second threshold voltage.

7. The key storage device of claim 5, wherein the absolute value of the third threshold voltage is equal to or higher than an absolute value of the fourth threshold voltage.

8. The key storage device of claim 5, wherein the absolute value of the third threshold voltage is equal to or higher than the absolute value of the first threshold voltage, and an absolute value of the fourth threshold voltage is equal to or lower than the absolute value of the second threshold voltage.

9. The key storage device of claim 4,
wherein the first setting transistor, the second setting transistor, the first output transistor, and the second output transistor are NMOS transistors,
wherein each of the at least one setting stage of the first setting circuit and each of the at least one setting stage of the second setting circuit generates a respective decreased voltage having a value that is lower than a value of an input voltage of the respective stage;

wherein the first logic value is low and the second logic value is high.

10. The key storage device of claim 4,
wherein the first setting transistor, the second setting transistor, the first output transistor, and the second output transistor are PMOS transistors,
wherein the at least one setting stage of the first setting circuit and each of the at least one setting stage of the second setting circuit generates a respective increased voltage having a value that is greater than a value of an input voltage of the respective stage;
wherein the first logic value is high and the second logic value is low.

11. The key storage device of claim 1,
wherein the first setting circuit and the second setting circuit respectively comprises a plurality of setting stages, wherein each of the setting stages comprises a setting transistor;
wherein a first stage of
 the first setting circuit comprises the first setting transistor and a first stage of the second setting circuit comprises the second setting transistor, a
 source of the first setting transistor is coupled to a gate of the setting transistor in a next stage, a gate of the setting transistor in a last stage is coupled to a source of the setting transistor in a previous stage, and a source of the setting transistor in a last stage outputs the first setting voltage or the second setting voltage.

12. The key storage device of claim 1,
wherein the first setting circuit comprises:
a third inverter, comprising the first setting transistor having the second threshold voltage, and comprising a first input node coupled to the first node, configured to output the first setting voltage as the second logic value to the first inverter through a third node;
wherein the second setting circuit comprises:
a fourth inverter, comprising the second setting transistor having the first threshold voltage, and comprising a second input node coupled to the second node, configured to output the second setting voltage as the first logic value to the second inverter through a fourth node.

13. The key storage device of claim 12,
wherein the first logic value is low and the second logic value is high;
wherein the first output transistor, the second output transistor, the first setting transistor and the second setting transistors are NMOS transistors.

14. The key storage device of claim 13,
wherein the first inverter further comprises:
a first PMOS transistor having a third threshold voltage, comprising a drain coupled to the first node and comprising a gate coupled to the third node;
wherein the second inverter further comprises:
a second PMOS transistor having a fourth threshold voltage, comprising a drain coupled to the second node and comprising a gate coupled to the fourth node;
wherein the third inverter further comprises:
a third PMOS transistor having the fourth threshold voltage, comprising a drain coupled to the third node and comprising a gate coupled to the first input node;
wherein the fourth inverter further comprises:
a fourth PMOS transistor having the third threshold voltage, comprising a drain coupled to the fourth node and comprising a gate coupled to the second input node;

wherein an absolute value of the fourth threshold voltage is lower than an absolute value of the third threshold voltage.

15. The key storage device of claim 1,
wherein the first output transistor and the second output transistor are NMOS transistors, the first inverter further comprises a first PMOS transistor having a third threshold voltage, the second inverter comprises a second PMOS transistor having a fourth threshold voltage;
wherein the first setting circuit comprises:
a third NMOS transistor, having the second threshold voltage, comprising a drain for outputting the first setting voltage; and
a third PMOS transistor, having the fourth threshold voltage;
wherein the drain and a gate of the third NMOS are shorted with a drain and a gate of the third PMOS transistor;
wherein the second setting circuit comprises:
a fourth NMOS transistor, having the first threshold voltage, comprising a drain for outputting the second setting voltage; and
a fourth PMOS transistor, having the third threshold voltage;
wherein the drain and a gate of the fourth NMOS transistor are shorted with a drain and a gate of the fourth PMOS transistor;
wherein an absolute value of the fourth threshold voltage is lower than an absolute value of the third threshold voltage.

16. The key storage device of claim 1, wherein voltages at each control terminal of transistors in the first key unit and the second key unit are fixed values.

17. The key storage device of claim 1, wherein layout structures of the first key unit and the second key unit are identical.

18. A key generation method, comprising:
generating a first setting voltage by a first setting circuit;
transmitting the first setting voltage to a first output transistor in a first inverter to generate a first logic value, wherein the first output transistor has a first threshold voltage;
generating a second setting voltage by a second setting circuit; and
transmitting the second setting voltage to a second output transistor in a second inverter to generate a second logic value, wherein the second output transistor has a second threshold voltage,
wherein an absolute value of the first threshold voltage is lower than an absolute value of the second threshold voltage,
wherein the first setting voltage is higher than the second setting voltage, and
 wherein the first setting circuit and the second setting circuit comprises a first setting transistor and a second setting transistor, respectively, receiving a constant voltage at a control terminal.

19. The key generation method of claim 18,
wherein the first logic value is low and the second logic value is high;
wherein the first setting circuit and the second setting circuit respectively comprises at least one setting stage;
wherein the key generation method further comprises:
generating by each of the at least one setting stage a respective decreased voltage having a value that is lower than a value of an input voltage of the respective stage, to respectively generate the first setting voltage and the second setting voltage.

20. The key generation method of claim 18,
wherein the first logic value is high and the second logic value is low;
wherein the first setting circuit and the second setting circuit respectively comprises at least one setting stage;
wherein the key generation method further comprises:
generating by each of the at least one setting stage a respective increased voltage having a value that is greater than a value of an input voltage of the respective stage, to respectively generate the first setting voltage and the second setting voltage.

* * * * *